(12) United States Patent
Ghiron et al.

(10) Patent No.: US 6,917,730 B2
(45) Date of Patent: Jul. 12, 2005

(54) ARRANGEMENTS FOR REDUCING WAVELENGTH SENSITIVITY IN PRISM-COUPLED SOI-BASED OPTICAL SYSTEMS

(75) Inventors: Margaret Ghiron, Allentown, PA (US); Prakash Gothoskar, Allentown, PA (US); Robert Keith Montgomery, Easton, PA (US); Vipulkumar Patel, Monmouth Junction, NJ (US); Soham Pathak, Allentown, PA (US); Kalpendu Shastri, Orefield, PA (US); Katherine A. Yanushefski, Zionsville, PA (US)

(73) Assignee: SiOptical, Inc., Allentown, PA (US)

( * ) Notice: Subject to any disclaimer, the term of this patent is extended or adjusted under 35 U.S.C. 154(b) by 0 days.

(21) Appl. No.: 10/833,642

(22) Filed: Apr. 28, 2004

(65) Prior Publication Data

US 2004/0213518 A1 Oct. 28, 2004

Related U.S. Application Data

(60) Provisional application No. 60/466,307, filed on Apr. 28, 2003.

(51) Int. Cl.[7] .............................................. G02B 6/12
(52) U.S. Cl. ............................ 385/14; 385/30; 385/31; 385/33; 385/36; 385/43; 385/129; 385/130
(58) Field of Search ............................ 385/30, 31, 36, 385/12, 14, 33, 39, 43, 129, 130, 131, 141, 27

(56) References Cited

U.S. PATENT DOCUMENTS 5,101,458 A * 3/1992 Spaulding et al. ............. 385/36
6,483,959 B1 * 11/2002 Singh et al. ................... 385/12
6,671,443 B2 * 12/2003 Deliwala ...................... 385/125
6,826,320 B2 * 11/2004 Deliwala ....................... 385/14
2002/0021765 A1 * 2/2002 Maleki et al. ............... 375/300
2002/0097401 A1 * 7/2002 Maleki et al. ............... 356/436
2003/0013304 A1 * 1/2003 Deliwala ...................... 438/689
2003/0032286 A1 * 2/2003 Deliwala et al. ............. 438/689
2003/0040175 A1 * 2/2003 Deliwala ...................... 438/669
2003/0118306 A1 * 6/2003 Deliwala ...................... 385/125
2004/0190826 A1 * 9/2004 Ghiron et al. .................. 385/36
2004/0202418 A1 * 10/2004 Ghiron et al. .................. 385/36
2004/0213518 A1 * 10/2004 Ghiron et al. .................. 385/36

FOREIGN PATENT DOCUMENTS

WO    WO 2004097902 A2 * 11/2004

* cited by examiner

*Primary Examiner*—Brian M. Healy (57) ABSTRACT

An optical coupling system for use with multiple wavelength optical signals provides improved coupling efficiency between a free-space optical beam and a relatively thin, surface layer of an SOI structure ("SOI layer"), allowing for sufficient coupling efficiency (greater than 50%) over a predetermined wavelength range. An evanescent coupling layer, disposed between a coupling prism and an SOI layer, is particularly configured to improve the coupling efficiency. In one embodiment, the thickness of the evanescent layer is reduced below an optimum value for a single wavelength, the reduced thickness improving coupling efficiency over a predetermined wavelength range around a defined center wavelength. Alternatively, a tapered thickness evanescent coupling layer may be used to improve coupling efficiency (or a combination of reduced thickness and tapered configuration). Optical beam steering can be combined with a modified evanescent coupling layer to control the input beam launch angle and further improve coupling efficiency.

62 Claims, 6 Drawing Sheets

WAVELENGTH DEPENDENCE OF BEAM ANGLE INSIDE PRISM (θ Si) AS A FUNCTION OF WAVELENGTH, FOR THREE DIFFERENT WAVEGUIDE THICKNESSES

ARRANGEMENTS FOR REDUCING WAVELENGTH SENSITIVITY IN PRISM-COUPLED SOI-BASED OPTICAL SYSTEMS

CROSS-REFERENCE TO RELATED APPLICATION

This application claims the benefit of Provisional Application No. 60/466,307, filed Apr. 28, 2003.

TECHNICAL FIELD

The present invention relates to arrangements for providing optical coupling between an external source and a relatively thin silicon waveguide layer in an SOI structure and, more particularly, to arrangements for providing coupling between variable-wavelength and multiple-wavelength sources and a thin silicon waveguide layer.

BACKGROUND OF THE INVENTION

To meet the bandwidth requirements of current and future high speed applications, state-of-the-art telecommunication components and systems must provide a host of sophisticated signal processing and routing functions, in both the optical and electronic domains. As the complexity level increases, integration of more functions and components within a single package is required to meet system-level requirements and reduce the associated size and cost of the end system. It has been recognized for some time that the integrated circuit devices, processes and techniques that revolutionized the electronics industry can be adapted to produce optoelectronic integrated circuits. In typical optoelectronic integrated circuits, light propagates through waveguides of high refractive index materials such as silicon, gallium arsenide, lithium niobate or indium phosphide. The use of high-index materials enables smaller size devices, since a higher degree of mode confinement and tighter bends may be accommodated. While all transmitter, signal processing and receiver functions may be incorporated in a single optoelectronic integrated circuit, the system may also be constructed from more than one package, referred to in the art and hereinafter as "hybrid optoelectronic integration", or "multi-module optoelectronic integration".

To enable many of the applications for telecommunications systems, it is necessary to consider the optical device performance when different wavelengths are launched into the device. For a number of applications, the wavelengths of interest fall in a continuous band delimited by a minimum wavelength $\lambda_{min}$ and a maximum wavelength $\lambda_{max}$. As an example, many wavelength-division-multiplexed (WDM) systems operate over a wavelength band defined as the "C-band" that roughly corresponds to a wavelength band from 1525–1570 nm. This same technique can be expanded to cover L-band (wavelength band from 1570–1620 nm), S-band (wavelength band from 1480–1520 nm), as well as other exemplary wavelength bands.

In more specific terms, there are two different classes of sources that are desired to be able to couple into an optical device: variable-wavelength sources and multiple-wavelength sources. A variable-wavelength source is defined as a source that only emits a narrow band of wavelengths, centered around a wavelength $\lambda_C$, where $\lambda_C$ can be varied via a tuning mechanism. One exemplary embodiment of a variable-wavelength source is a tunable laser module, operating with a center wavelength $\lambda_C$ that can be tuned over the C-band wavelength range; similar modules would provide tuning over other exemplary bands. The typical linewidth of such an exemplary source is quite narrow, on the order of 0.05 pm, and the shift in $\lambda_c$ with temperature is on the order of ±0.05 nm. A multiple-wavelength source is defined as a source that simultaneously emits several wavelengths centered on a wavelength $\lambda_C$. One exemplary embodiment of a multiple-wavelength source is an optical fiber input carrying a WDM signal, operating over the band of 1530–1565 nm, with a separation of 0.4 nm (50 GHz) or 0.8 nm (100 GHz) between adjacent wavelengths.

In the prior art, techniques referred to as "butt coupling" or "end-fire coupling" have commonly been used to couple light from external sources into optical waveguides. Specifically, end facets are cleaved on the waveguides, and optical fibers (which may be lensed for focusing purposes) are aligned to the input and output waveguide facets. While these coupling methods are relatively wavelength-insensitive, the insertion loss associated with such an arrangement increases substantially as the waveguide thickness drops below 2.0 μm. For sub-micron thick waveguides, the dimensional mismatch between the input/output beams and the thickness of the waveguide results in an insertion loss that is unacceptable for many applications.

To improve the insertion loss associated with wavelength-insensitive coupling into relatively thin waveguides, a variety of tapered structures that gradually reduce the beam size from its large external value to a dimension that is more closely matched to the waveguide have been proposed. Some examples include tapers that neck down in one or two dimensions from the external beam to the waveguide, and an "inverse taper" or "nanotapers" that has a narrow tip (often on the order of 100 nm wide) at the external beam, which then increases laterally in dimension until it matches the waveguide width. Of these examples, only the inverse taper has been successfully used to couple an appreciable amount of light into sub-micron waveguides. However, the inverse taper arrangement suffers from a number of drawbacks, such as: (1) a rapid increase in insertion loss with sub-micron misalignments; (2) the need for specialized techniques, such as e-beam lithography, to fabricate the nanotapers; and (3) the need for additional waveguiding structures prior to the tip of the nanotapers if the end of the tip is not coincident with the edge of the input facet.

Thus, a need remains in the art for providing a robust and manufacturable arrangement that is capable of coupling various types of multiple wavelength external sources into a relatively thin, planar silicon waveguide.

SUMMARY OF THE INVENTION

The need remaining in the prior art is addressed by the present invention, which relates to arrangements for providing coupling (using a prism coupling structure) between variable-wavelength and multiple-wavelength sources and a thin silicon waveguide layer and, more particularly, to utilizing evanescent coupling layer design variations to accommodate the variations in input wavelength.

In accordance with the present invention, a prism coupling arrangement is used to couple a free space optical signal into and out of a relatively thin, planar silicon waveguide (e.g., less than one micron in thickness) with an evanescent coupling layer disposed between the prism coupling arrangement and the silicon waveguide to effectuate the coupling. The refractive effects of the input/output facets of the prism coupling arrangement, as well as the characteristics of the evanescent coupling layer, are controlled and adjusted, in accordance with the present invention, to maximize the coupling efficiency between external lightwave sources of various optical signal wavelengths and the planar silicon waveguide.

In a first embodiment of the present invention, the thickness of the evanescent coupling layer is reduced (with respect to the optimum value associated with a single wavelength $\lambda_c$) to reduce optical coupling loss in an extended wavelength range centered around $\lambda_c$. In various arrangements of this first embodiment, both the material and thickness of the evanescent coupling layer may be modified to change the wavelength range of interest and/or the coupling loss over a given wavelength range. In particular, materials with a relatively large refractive index (e.g., n=2) have been found to reduce the coupling loss. Additionally, the use of a reduced-thickness evanescent coupling layer, formed of the higher refractive index material, will exhibit even less loss. Multiple materials of differing values of refractive index may be used to form a graded index evanescent coupling layer. Optical beam steering arrangements may also be employed with these modifications to the evanescent coupling layer to optimize the angle of incidence and entry point on an prism coupling input facet, further improving the coupling efficiency.

In a second embodiment of the present invention, the sensitivity to wavelength variation for a multiple-wavelength external source (such as in WDM applications) is minimized by utilizing a tapered evanescent coupling layer. The evanescent coupling layer is formed to have a monotonically increasing thickness along its input portion such that selected portions of an input beam intercept thicknesses that are under-coupled, while different selected portions of the same beam sample over-coupled thicknesses. A monotonically decreasing thickness at an output location performs the same function. Again, various materials of different refractive index may be used to form a tapered evanescent coupling layer, and/or multiple layered structures may be formed, with optical beam steering used, if desired, to further reduce wavelength sensitivity.

Other and further arrangements and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
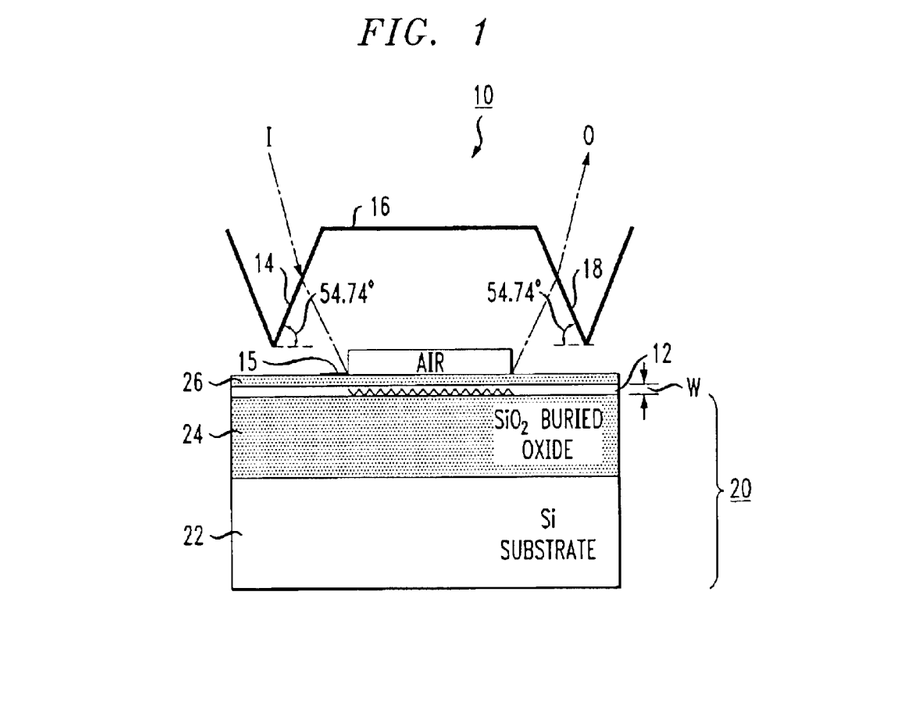
FIG. 1 illustrates an exemplary prism coupling arrangement for providing optical signal coupling between an external signal source and a relatively thin, planar silicon optical waveguide.

The various embodiments of the present invention are all directed to the utilization of the evanescent coupling of light into and out of thin (e.g., sub-micron) silicon waveguides that are formed within a surface single crystal silicon layer (the "SOI layer") of an SOI structure that consists of a silicon substrate, a buried dielectric layer and the surface SOI layer. A preferred arrangement for providing optical coupling of a free space optical beam into and out of the thin silicon waveguide is to use a prism coupling arrangement, as described in detail in our co-pending applications Ser. No. 10/668,947, filed Sep. 23, 2003 and Ser. No. 10/720,372, filed Nov. 24, 2003. FIG. 1 illustrates an exemplary prism coupling arrangement 10 between free space input and output optical beams, denoted as I and O, respectively, and a thin silicon waveguide within an SOI layer 12. As shown, SOI layer 12 comprises the surface layer of an SOI structure 20 that further comprises a silicon substrate 22 and buried dielectric layer 24 (where layer 24 may comprise a material such as, but not limited to, silicon dioxide).

An evanescent coupling layer 26 is illustrated as disposed over SOI layer 12, where evanescent coupling layer 26, in combination with buried dielectric layer 24, need to exhibit an index of refraction less than that of SOI layer 12 in order to maintain guiding along the extent of the waveguide, as shown in FIG. 1. For example, silicon dioxide (n=1.45) is used in many arrangements for evanescent coupling layer 26, while the SOI layer 12 has a refractive index of approximately 3.5 for telecommunication wavelengths. As will be discussed in detail below, materials with a higher index of refraction have been found to reduce coupling loss in some cases. A prism coupling arrangement is illustrated as disposed over evanescent coupling layer 26, where this embodiment comprises a single, trapezoidal prism 16 (formed of silicon, for example), including an input facet 14 for coupling an input beam I into the arrangement and an output facet 18 for coupling an output beam O out of the arrangement. When formed using conventional silicon processing/etching techniques, input facet 14 and output facet 18 are both disposed at an angle of 54.74° with respect to the horizontal plane.

Figure 2:
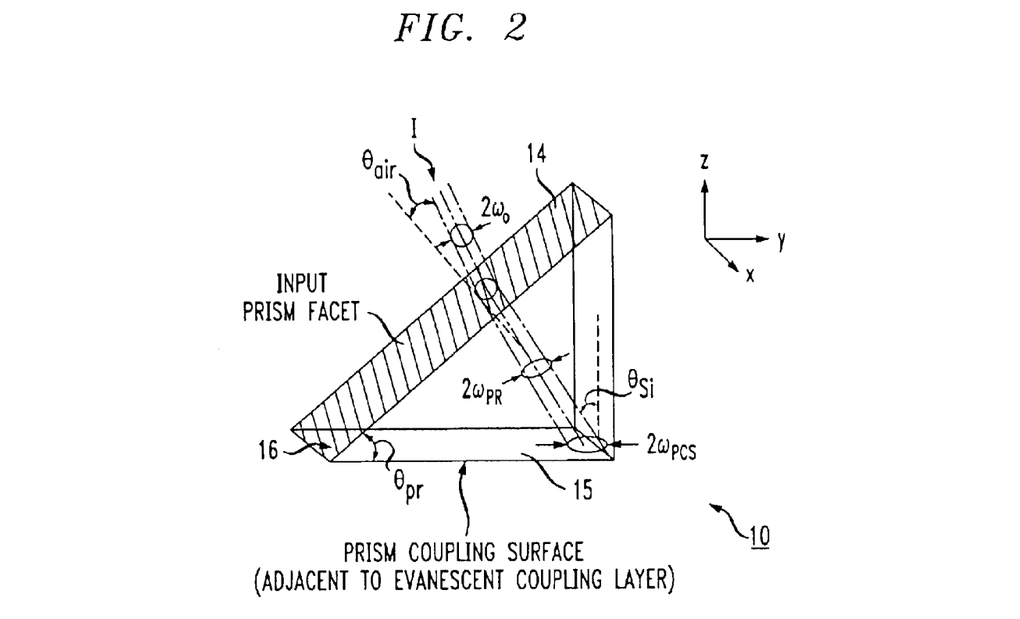
FIG. 2 contains a diagram detailing the angular parameters associated with using a prism coupler to provide high coupling efficiency between a free space beam (i.e., an "external source") and a relatively thin, planar optical waveguide.

In the arrangement as illustrated in FIG. 1, input beam I must be launched at an angle of incidence that is determined by the wavelength of light, λ, the polarization state of the incident light, the refractive indexes and thicknesses of SOI layer 12, buried dielectric layer 24 and evanescent coupling layer 26, and the refractive indexes of prism coupler 16 and the surrounding medium (e.g., "air"). FIG. 2 contains a diagram illustrating the particular parameters of concern for launching input beam I into input facet 14 of prism coupler 16 (where only a portion of prism coupler 16 is illustrated for the sake of clarity). As shown in FIG. 2, there are two relevant angles: (1) $\theta_{Si}$, the beam angle in prism coupler 16 relative to the normal N (coincident with the z axis of FIG. 2) of the plane of signal propagation along SOI layer 12 (see FIG. 1), and denoted as a prism coupling surface 15 in FIG. 2; and (2) $\theta_{air}$, the input beam angle of incidence on input facet 14 of prism coupler 16. The value of $\theta_{air}$ is determined by applying the well-known Snell's law at the air/prism interface.

Figure 3:
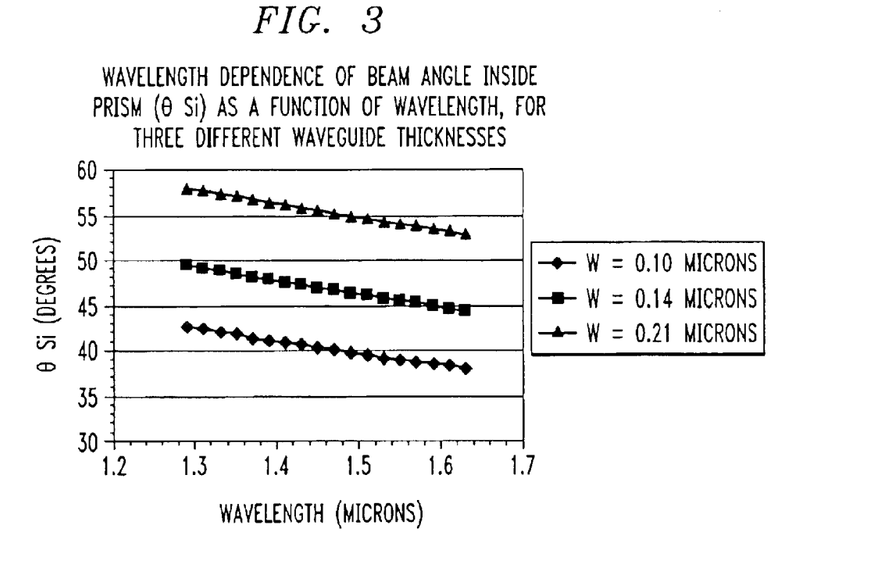
FIG. 3 is a graph illustrating the optical beam launch angle inside the prism coupler ($\theta_{si}$) as a function of wavelength, the graph illustrating this data for three different, sub-micron thicknesses of an SOI layer optical waveguide.

FIG. 3 contains a graph illustrating the change in $\theta_{Si}$ as a function of input beam wavelength λ, for three different thicknesses (denoted by the letter "W") of SOI layer 12 (i.e., 0.10 μm, 0.14 μm, and 0.21 μm). It can be concluded from these plots that the change in $\theta_{Si}$ can be approximated as a linear function of λ over a fairly broad range of wavelengths of interest, and can be expressed as:

$$\theta_{Si}(W,\lambda) = \theta_{Si}(W, \lambda_C) + c(W)*(\lambda - \lambda_c)$$

where $c \approx -0.0144°$/nm for W=0.14 μm and 0.21 μm, and $c \approx -0.0129°$/nm for W=0.10 μm. When using the arrangement as shown in FIG. 1 with an input beam I operating at a single wavelength $\lambda_c$, the coupling efficiency will be maximized for $\theta_{Si}(W, \lambda_c)$. The coupling efficiency for wavelengths λ in the vicinity of $\lambda_c$ will depend on the width of the coupling curve as a function of wavelength. If the coupling efficiency is denoted as η, then it can be shown that for an evanescent coupling layer of constant thickness and constant refractive index, the coupling efficiency as a function of wavelength η(λ) can be expressed as follows:

$$\eta(\lambda) = \frac{\eta_{\max}(\alpha\omega_{PCS})}{1 + \frac{4\pi^2 n_{Si}^2 \omega_{PCS}^2}{(\alpha\omega_{PCS})^2} \frac{\{\sin[\theta_{Si}(\lambda_c) + c(\lambda - \lambda_c)] - \sin[\theta_{Si}(\lambda_c)]\}^2}{\lambda^2}}$$

where $\omega_{PCS}$ is defined as the radius of the projection of input beam I on prism coupling surface 15 of prism coupler 16, as shown in FIG. 2, $\alpha\omega_{PCS}$ is a parameter that sets the coupling efficiency for an evanescent coupling layer 26 having a constant thickness and constant refractive index, and $n_{Si}$ is the refractive index of silicon (a value of approximately 3.5 for the wavelength range of interest).

Figure 4:
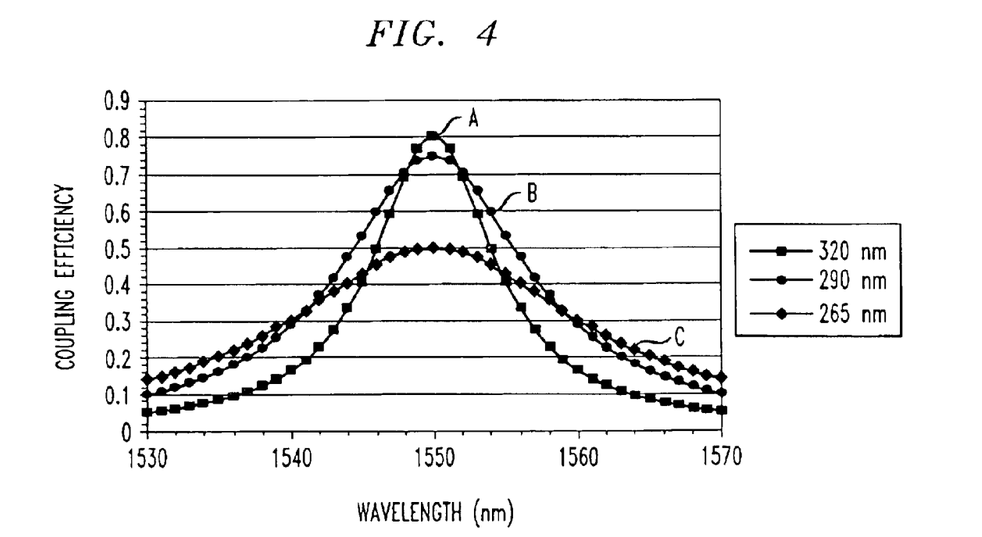
FIG. 4 is a graph illustrating the coupling efficiency as a function of wavelength for three different thicknesses of evanescent coupling layer, the evanescent coupling layer formed of silicon dioxide.

As mentioned above, reduced optical loss (increased coupling efficiency) over a certain wavelength range can be achieved in accordance with the present invention by reducing the thickness of the evanescent coupling layer from the value associated obtaining maximum coupling at a given wavelength $\lambda_c$. FIG. 4 contains a graph illustrating this aspect, plotting coupling efficiency as a function of wavelength for three different values of evanescent layer thickness. In each case, the polarization state corresponds to the transverse electric (TE) mode, the center wavelength $\lambda_c=1550$ nm, the input free space beam has a Gaussian beam diameter ($2\omega_0$) of 63 μm, the relatively thin silicon waveguide layer has a thickness of 0.14 μm, and an evanescent coupling layer of silicon dioxide has an index of refraction of 1.45. Plot A, associated with the prior art, is for an evanescent layer of a thickness selected to achieve maximum coupling efficiency at $\lambda_c$ (1550 nm), where in this case, the evanescent coupling layer thickness is approximately 320 nm and the efficiency is 80%. As shown, the efficiency falls off rather rapidly with wavelength for this evanescent coupling layer thickness, with an efficiency of less than 50% (3 dB) for wavelengths ±5 nm from $\lambda_c$. Plot B is associated with a slightly reduced thickness for the evanescent coupling layer, a value of 290 nm (this case being referred as a "modestly overcoupled" condition). As shown, the coupling efficiency at $\lambda_c$ is slightly reduced (to a value of approximately 75%), but the 3 dB points have been expanded to ±8 nm around $\lambda_c$, thus broadening the wavelength range of acceptable coupling efficiency. Reducing the thickness of the evanescent coupling layer even further (to a "moderately overcoupled" condition), as shown in plot C, to a value of 265 nm, substantially reduces the peak coupling efficiency (to about 50%), but provides an increase in the 3 dB points to a value of ±12 nm. In this case, therefore, the variation in coupling efficiency over a rather large wavelength range is significantly reduced, but at the cost of a maximum efficiency no greater than 50%.

Figure 5:
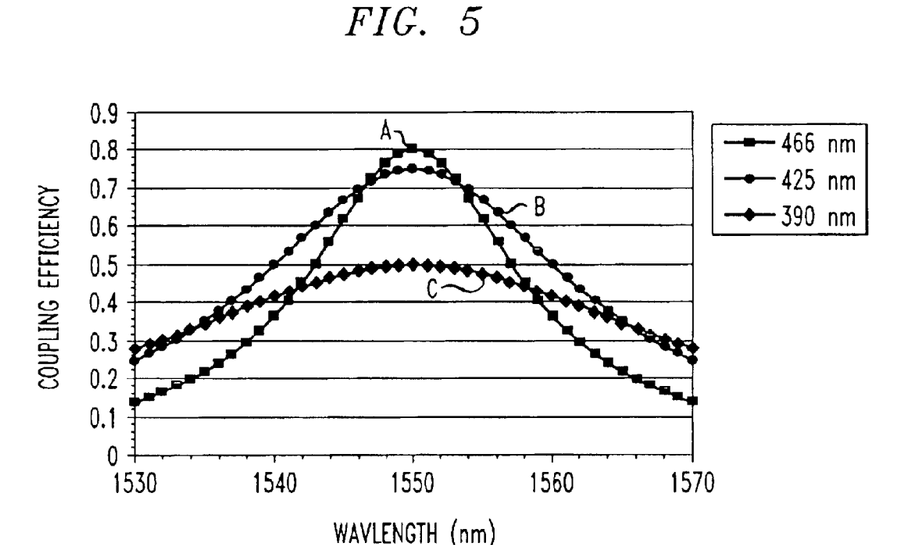
FIG. 5 is a graph of coupling efficiency as a function of wavelength when using a silicon nitride evanescent coupling layer, the graph illustrating the coupling efficiency for three different thickness values of the evanescent coupling layer.

Other parameters of the evanescent coupling layer may be modified, in addition with its thickness, in order to improve upon the results illustrated in FIG. 4. For example, using materials exhibiting a higher index of refraction will improve the performance by reducing the slope c in the expression of coupling efficiency as discussed above. Alternatively, a multi-layer evanescent coupling structure may be used (each layer of a different material), or a graded index structure may be used, with an increasing value of index along the direction of signal propagation within the SOI layer. FIG. 5 contains a set of plots, similar to those discussed above in association with FIG. 4, where the plots of FIG. 5 were obtained using silicon nitride as the material for the evanescent coupling layer (n=2.0), a prism facet angle $\theta_{pr}$ of 45°, and a silicon waveguide thickness of 0.10 μm. The center wavelength $\lambda_c$ and input beam diameter $2\omega_0$ maintain their same values, namely 1550 nm and 63 μm, respectively. Plot A, representing the prior art, illustrates the arrangement that provides for maximum coupling efficiency (80%) at $\lambda_c$, where in this case an evanescent coupling layer thickness of 466 nm is required to provide this maximum efficiency. As a result of the reduced slope in the efficiency curve, the plots of both the prior art "maximum coupling efficiency" and the reduced thickness evanescent coupling layer (plots B and C) are broadened when compared to the results in FIG. 4, by a factor of approximately 1.75. For example, referring to plot B, the same 5% reduction in maximum coupling efficiency at $\lambda_c$ as shown in prior plot B, now has an extended 3 dB range of ±14 nm for this modestly overcoupled embodiment. As shown by plots B and C, coupling efficiencies greater than 50% can now be maintained over the wavelength range from 1535 to 1565 nm. This is significant, since it is now possible, in accordance with this advance of the present invention, to transmit signals over a bandwidth that is comparable in width to the telecommunications C-band, with a variation in insertion loss of less than 3 dB across the entire band. Some additional small gains in wavelength coverage can also be effected by selecting an appropriate layer thickness (W) for the relatively thin silicon waveguide, if the device constraints permit such a choice. This is due to the fact that the slope, c, and thus the variation of $\theta_{Si}$ with wavelength, is a function of waveguide thickness.

Referring again to the equation for coupling efficiency, it is apparent that another source of wavelength sensitivity is the dependence of the wavelength on the value of the angle $\theta_{Si}$. For some applications, such as those that utilize a tunable laser as an external signal source, the input signal is characterized as a narrow band signal (in this case, set by the linewidth of the laser) with a variable center wavelength. Since $\theta_{Si}$ and $\theta_{air}$ are related through Snell's law, it is possible to control/vary the value of $\theta_{Si}$ by controlling/varying the value of $\theta_{air}$, since $\theta_{Si}=\theta_{pr}-\sin^{-1}(\sin \theta_{air}/n_{Si})$.

Figure 6:
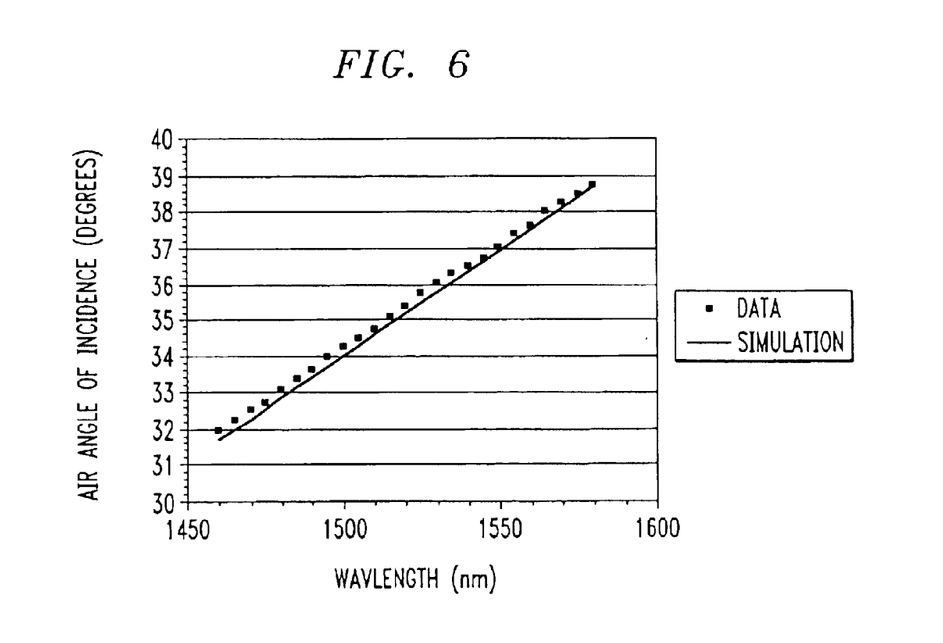
FIG. 6 is a plot of both simulation results and measured data of the change in incident angle at the prism input facet ($\theta_{air}$) as a function of wavelength.

FIG. 6 contains a graph illustrating the relationship between $\theta_{air}$ and wavelength, the data collected using an SOI layer waveguide of thickness W=0.136 µm, and a constant thickness silicon dioxide evanescent coupling layer that was 395 nm thick. In this experiment, a free space beam diameter of approximately 200 µm was used, and the TE mode polarization state was launched. It is seen that the collected data is in good agreement with the simulation, illustrating a slope of approximately 0.06±0.01°/nm. Therefore, as a result of the direct relation between $\theta_{air}$ and $\theta_{Si}$, it is clear that by modifying $\theta_{air}$ as the center wavelength changes, the value for $\theta_{Si}$ will also change, so as to yield the optimum angle for the current center wavelength.

Figure 7:
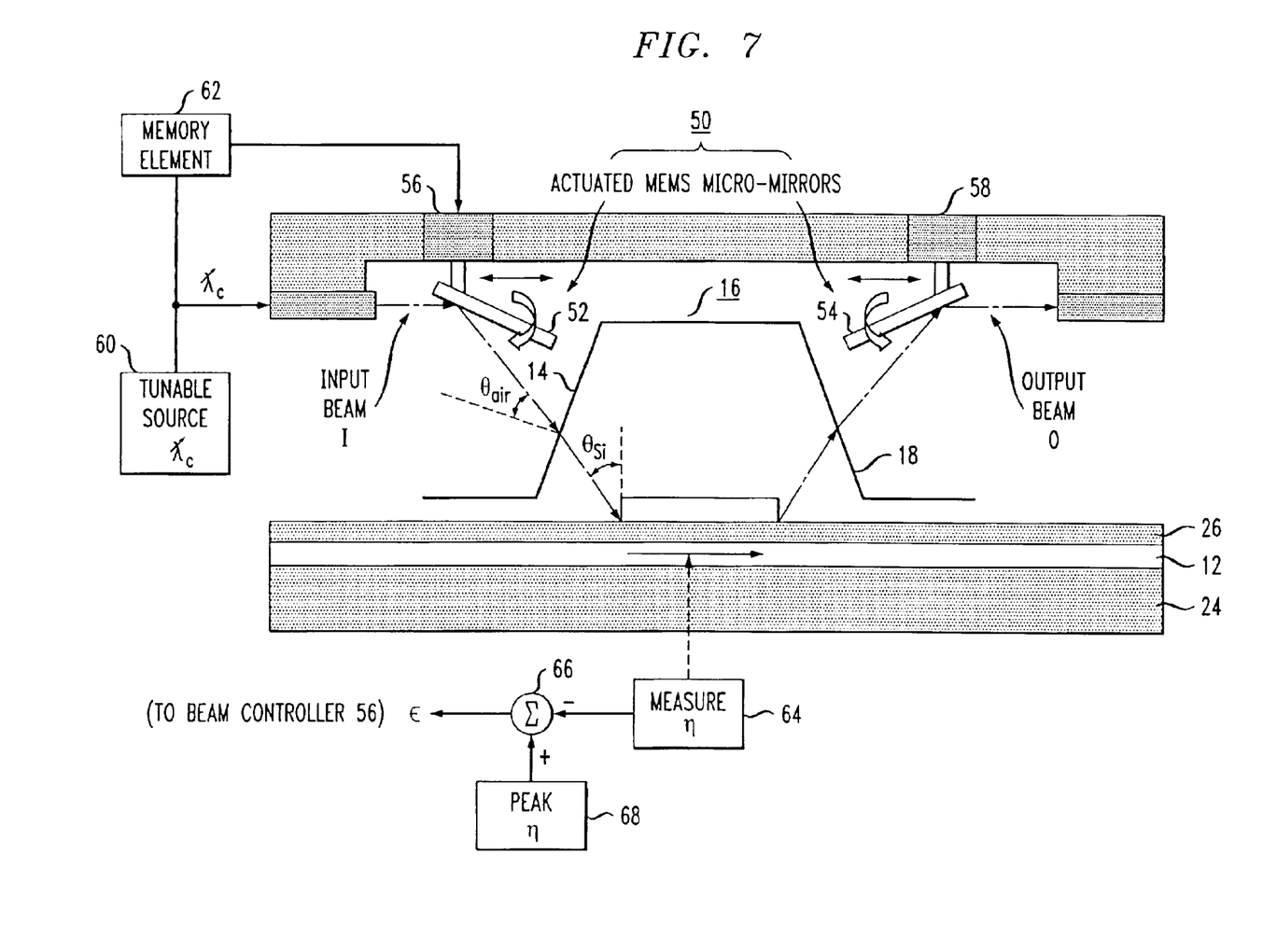
FIG. 7 is an exemplary beam steering arrangement that may be used in accordance with the present invention to modify/steer the angle of incidence of an optical beam at the prism coupler input facet.

In accordance with the present invention, therefore, an arrangement has been developed that will adjust $\theta_{Si}$ to the optimum value for the center wavelength currently being used (with the ability to re-adjust $\theta_{Si}$ as this center wavelength changes, that is, as the laser is tuned) by adjusting $\theta_{air}$. FIG. 7 illustrates an arrangement 50 for adjusting (steering) the incidence of input beam I to find the appropriate free space launch angle $\theta_{air}$ and entry point that will yield the launch angle $\theta_{Si}$ associated with the maximum coupling efficiency between prism coupler 16 and SOI layer 12. The particular arrangement 50 illustrated in FIG. 7 utilizes a pair of MEMS mirrors 52 and 54 to perform the beam steering operation, but it is to be understood that any other arrangement capable of steering the incidence angle of a free space beam may also be used.

Referring to FIG. 7, a first MEMS mirror 52 of arrangement 50 is moved using a first control element 56. First MEMS mirror 52 is capable of both translational movement and rotational movement, as indicated by the arrows in FIG. 7. An incoming light beam I (from a fiber, preferably a lensed fiber, for example) is coupled into arrangement 50 and, in this particular embodiment, follows a horizontal signal path to impinge on first MEMS mirror 52. As shown, first MEMS mirror 52 reflects input beam I, re-directing the beam onto input facet 14 of prism coupler 16. The incident angle $\theta_{air}$ is measured with respect to the normal of input facet 14, and can then be translated to an associated value for $\theta_{Si}$. Therefore, by adjusting the translational and rotational movements of first MEMS mirror 52, the mirror configuration associated with maximum coupling efficiency for a given center wavelength $\lambda_c$ can be determined.

As mentioned above, this beam steering arrangement is particularly well-suited for use with tunable external sources, such as a tunable laser 60, where the source exhibits a rather narrow linewidth (e.g., 0.05 pm), but the center wavelength itself may be "tuned" over a range of 35 nm or more. Indeed, it is possible in accordance with the present invention, to establish a set of configurations for first MEMS mirror 52 associated with a predetermined set of possible center wavelength values for tunable source 60. These configurational values may be stored in a memory element 62, so that as the center wavelength of tunable source 60 is changed, memory element 62 will transmit the proper translational and rotational values for first MEMS mirror 52 to first controller 56. In accordance with this particular aspect of the present invention, a second MEMS mirror 54 and associated controller 58 may also be disposed within arrangement 50 to properly capture output beam O and direct the output beam into an output coupling arrangement. Indeed, the translational and rotational position values for second MEMS mirror 54 may also be stored in memory element 62. Although not illustrated in FIG. 7, a plurality of such beam steering elements may also be used, each element associated with a different incoming optical signal of a plurality of optical signals. Further, an optically transmissive element may be used instead of an optically reflective element in various other embodiments.

With the addition of a beam steering arrangement, such as illustrated in FIG. 7, it is possible to add a feedback control mechanism to dynamically adjust the position of first MEMS mirror 52 to account for slight changes in the input wavelength (as a function of aging, drift, etc.). In particular, a portion of the input signal coupled into SOI layer 12 may be tapped off and used to measure the coupling efficiency at the input, where a measurement device 64 is illustrated in FIG. 7 as used to measure coupling efficiency. As discussed above, the relationship between coupling efficiency, $\theta_{Si}$ and $\theta_{air}$ has already been established. Therefore, if the coupling efficiency begins to decrease, as measured by measurement device 64, a look-up table within first controller 56 of first MEMS mirror 52 (or within memory element 62) will calculate corrective translational and/or rotational values needed to restore the incident angle to the value associated with maximum efficiency. In the particular feedback arrangement as illustrated in FIG. 7, the coupling efficiency measurement from device 64 is applied as a first input to an adder 66, where the second input to adder 66 is the "known" optimum coupling efficiency value 68. The difference between these two values, therefore, forms an "error" signal, ϵ, that is then fed back to first controller 56 to use to select the proper correction values. It is to be understood that various other feedback arrangements may be used, and the feedback technique may also be used with the output portion of the beam steering arrangement of FIG. 7.

Figure 8:
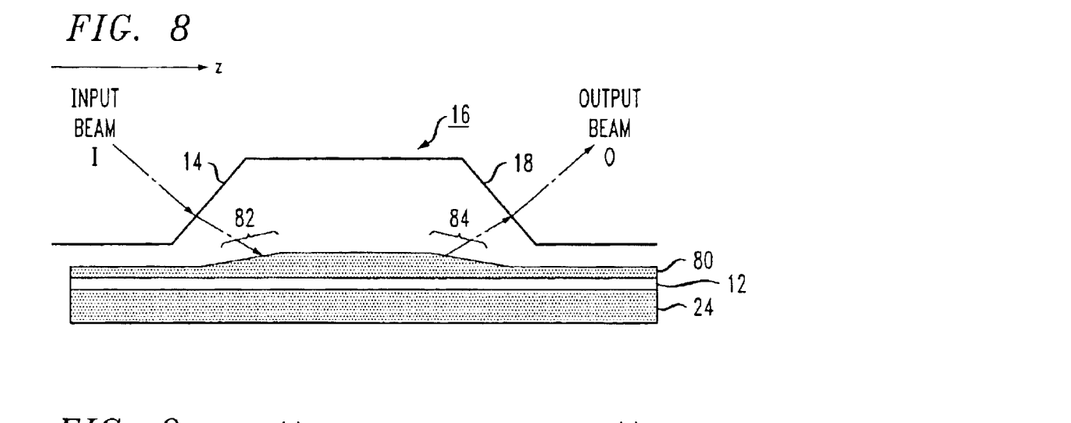
FIG. 8 illustrates a second embodiment of the present invention, utilizing a tapered evanescent coupling layer to reduce the wavelength sensitivity of the coupling arrangement.
Figure 9:
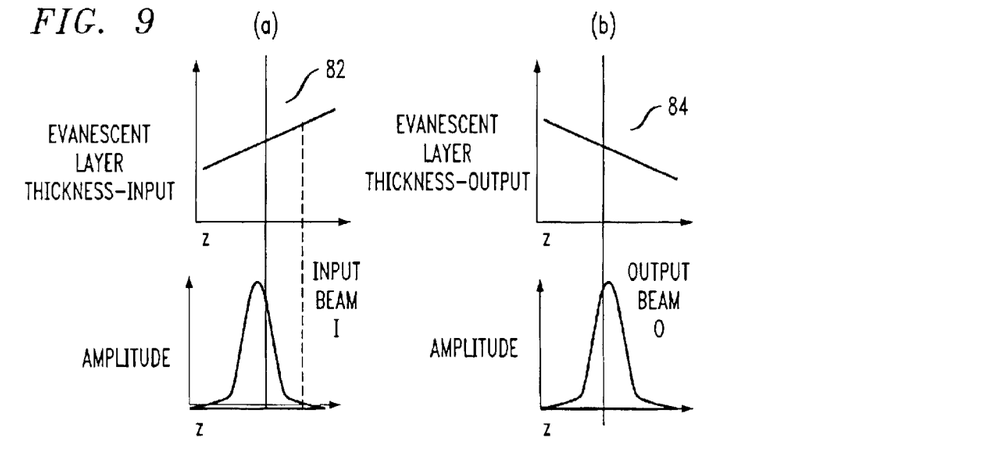
FIG. 9 is a set of simplified graphs illustrating the relationship between the tapered evanescent coupling layer and beam amplitude at both the input (FIG. 9(a)) and the output (FIG. 9(b))

Another embodiment capable of providing improvement in wavelength sensitivity is illustrated in FIG. 8. In this case, and as discussed briefly above, an evanescent coupling layer of tapered thickness at its input and output portions is used to improve coupling efficiency over a wider range of wavelengths than is possible with a "flat" evanescent coupling layer. In particular, and similar to the previous figures, FIG. 8 illustrates the use prism coupler 16 with input facet 14 and output facet 18 to couple free space optical beams (I and O) into and out of thick sub-micron thick optical waveguide formed within SOI layer 12. In this embodiment, however, a tapered evanescent coupling layer 80 is used to provide the coupling between prism coupler 16 and SOI layer 12. As shown, tapered evanescent coupling layer 80 includes an input coupling portion 82 of monotonically increasing thickness and an output coupling portion 84 of monotonically decreasing thickness. In one case, a linear increase and decrease may be used. FIG. 9 contains simplified graphs depicting the thickness variation of the evanescent coupling region in association with the amplitude of the optical beams, FIG. 9(a) for the input portion of the arrangement of FIG. 8, and FIG. 9(b) for the output portion of the arrangement of FIG. 8.

There are at least three principal advantages of using a tapered evanescent coupling region, as will be evident from the coupling efficiency results discussed below. First, the coupling efficiency at the center wavelength $\lambda_c$ is improved over that obtained with a constant thickness evanescent coupling layer. In some cases, the coupling efficiency can be improved from a value of 80% to approximately 97%. Thus, a wavelength range sensitivity broadening technique (such as the use of a thinner evanescent coupling layer and/or a different material, as discussed above) may be used in combination with the tapered evanescent coupling layer to provide both a relatively high coupling efficiency at $\lambda_c$ and an acceptable level of coupling efficiency over an extended wavelength range. Also, when using an evanescent coupling layer of varying thickness, the input beam essentially intercepts a variety of thickness values. That is, a significant section of the input beam (on the order of 50%) intercepts evanescent coupling layer thicknesses along input portion 82 that are less than the optimal value (the "optimal" being defined as for a constant thickness evanescent coupling layer). This is clearly seen in the graphs of FIG. 9(a). The same is true for the out-coupled beam as it impinges output coupling portion 84, as illustrated in FIG. 9(b). Therefore, since at least half of each beam experiences a reduced thickness, the wavelength sensitivity is reduced, for the reasons discussed above. Finally, since the tapered evanescent coupling region has a high degree of mode matching to both the input and output Gaussian beams, the arrangement of the present invention is especially convenient to use with conventional transmitting and receiving optical elements, such as optical fibers.

Figure 10:
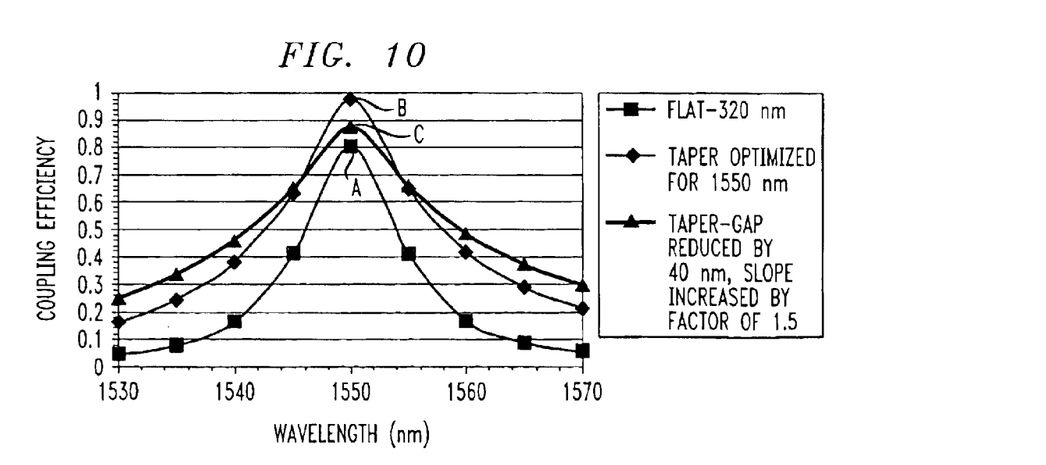
FIG. 10 is a graph of coupling efficiency, illustrating the efficiency for both a "constant thickness" evanescent coupling layer, and two different embodiments of a tapered evanescent coupling layer.

FIG. 10 contains a graph illustrating the improvement in coupling efficiency associated with using a tapered evanescent coupling layer similar to that shown schematically in FIG. 8. The values for the plots of FIG. 10 were obtained for a center wavelength $\lambda_c$ of 1550 nm and a free space beam diameter $2\omega_0$ of 63 μm at the TE mode polarization state, a silicon dioxide evanescent coupling layer with an index of refraction of 1.45 and a prism coupling angle $\theta_{pr}$ of 54.74°. Curve A illustrates, for the sake of comparison, the coupling efficiency for a constant thickness evanescent coupling layer (similar to the results of curve A illustrated in FIG. 4), where in this case the thickness is approximately 320 nm. The plot of curve B is associated with a tapered evanescent coupling layer that has been optimized for a center wavelength of 1550 nm. That is, the taper has been chosen to provide for a maximum coupling efficiency (in this case, 97.5%) at 1550 nm. It can be shown that for a linearly varying tapered portion, the slope associated with this taper is approximately 0.1°. Note that the coupling efficiency over the entire wavelength range is improved when compared to using a constant thickness evanescent coupling layer. Curve C is associated with a tapered evanescent coupling layer that is also slightly reduced in thickness for all points sampled by the beam (compared to the optimal value), the reduction being approximately 40 nm and an increase in slope to approximately 0.15°. As with curve B, the evanescent layer associated with the measurements for curve C also yields coupling efficiencies that are better over the entire wavelength range than the coupling efficiency associated with the constant thickness embodiment. For both tapered evanescent coupling layers, the coupling efficiency at the outer regions of the wavelength range is improved by a factor of 2 to 3. In addition, the coupling efficiency at the center wavelength $\lambda_c$ is greater by at least 10 to 20%. Thus, in accordance with this embodiment of the present invention, the use of an evanescent coupling layer of varying thickness can significantly improve the light transmission through the associated SOI layer at not only a single wavelength, but over a predetermined wavelength range. Since the efficiency is improved significantly at all wavelengths, it is possible to tailor some of the other device parameters for a wavelength range of a specific width. For example, the variation in coupling efficiency across the wavelength range can be reduced without substantial reductions in the efficiency near the center of the band.

Figure 11:
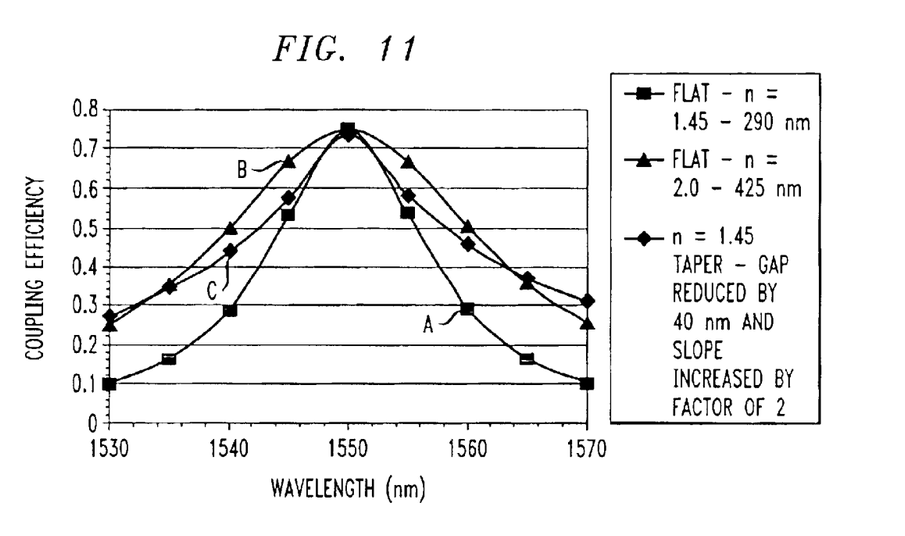
FIG. 11 is a graph comparing the improvement in coupling efficiency associated with using a tapered evanescent coupling layer to two different "constant thickness" evanescent coupling layers.
Figure 12:
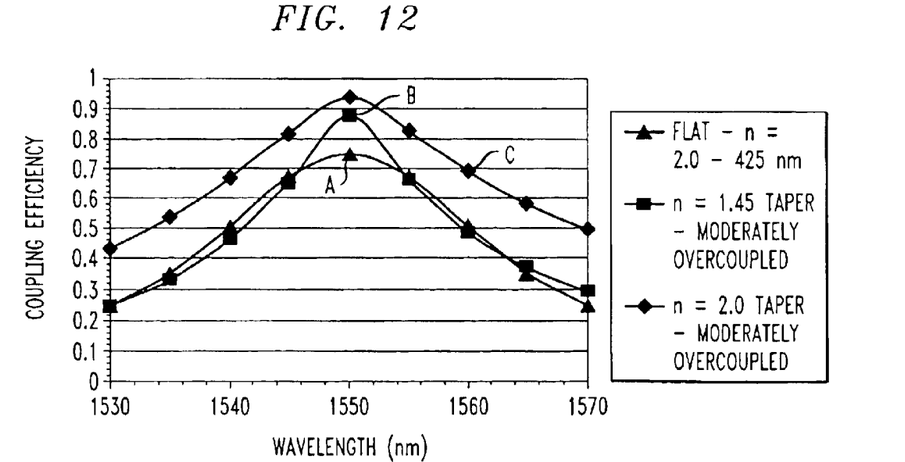
FIG. 12 is a graph comparing the coupling efficiencies associated with a set of three "optimum" evanescent coupling arrangements formed in accordance with the present invention.

The plots of FIG. 11 compare the coupling efficiencies for three different configurations, all constrained to yield a coupling efficiency of 75% at a center wavelength of 1550 nm. Curve A, as shown prior in FIG. 4, illustrates the case of an evanescent coupling layer of constant thickness (320 nm), the layer comprising silicon dioxide. Curve B is also associated with a constant thickness evanescent coupling layer (466 nm), this curve associated with the use of silicon nitride. The final plot, curve C, represents a configuration with an evanescent coupling layer of linearly varying thickness and refractive index of 1.45 (silicon dioxide). As shown in FIG. 11, this last configuration provides the same degree of spectral broadening as is achieved by using the higher index material associated with curve B. This is a significant result, since a smaller number of materials are required to produce this arrangement. Therefore, by tapering the thickness of the evanescent coupling layer, a silicon dioxide material layer may be used and perform as well as a layer comprised of silicon nitride. It is further presumed, moreover, that for those cases where a material such as silicon nitride may be used, the combination of a tapered evanescent coupling layer with a relatively large index of refraction will even further improve the coupling efficiency over the same wavelength range. FIG. 12, for example, contains a set of plots for three optimized conditions: curve A associated with using a silicon nitride evanescent coupling layer of constant thickness, curve B associated with using a silicon dioxide tapered evanescent coupling layer, and curve C associated with using a silicon nitride tapered evanescent coupling layer—each curve determined in association with a center wavelength of 1550 nm. In the latter arrangement, it should be noted that the coupling efficiency has been increased on the average of 40–50% over the entire wavelength range.

It should be noted that a beam steering arrangement may be used in combination with a tapered evanescent coupling layer to further control the precise location along the taper where the center of the beam intercepts the evanescent coupling layer. Further, another embodiment of an evanescent coupling layer for providing reduced wavelength sensitivity can be formed by "grading" the effective refractive index of the evanescent coupling layer along the propagation direction of the optical signal in the SOI layer. In particular, the refractive index variation is modified (graded) so that it tends to equalize the value of $\theta_{Si}$ over the desired wavelength range. In particular, the effective refractive index may be realized by using a dual-layer structure, with a first layer comprising a first material and formed to comprise a constant thickness. A second layer, of another material, is formed as a taper over the first layer. Thus, the effective refractive index increases (along the input) as the signal propagated along the waveguide. In one embodiment, the tapered layer may be realized by using alternate layers of materials with appropriate indexes, where the layers may be alternated either horizontally or vertically.

It is to be understood that the above-described embodiments of the present invention are exemplary only, and should not be considered to define or limit the scope of the present invention. Indeed, the present invention is most properly defined by the claims appended hereto.

What is claimed is:

1. An arrangement for providing optical coupling between an external light source generating optical signals at a plurality of different wavelengths, the plurality defined by a wavelength range and a center wavelength, and a relatively thin, planar silicon optical waveguide, the arrangement comprising:

an evanescent coupling layer disposed over at least a portion of the planar silicon optical waveguide, the evanescent coupling layer exhibiting a refractive index less than the refractive index of silicon and having a substantially constant thickness of an average value selected for minimizing optical loss over the wavelength range associated with the external light source; and a silicon-based prism coupling structure disposed over the evanescent coupling layer, the prism coupling structure including an input facet formed at a predetermined angle with respect to the waveguide surface and an output facet formed at the predetermined angle with respect to the waveguide surface, the prism coupling structure further including a planar lower surface disposed over the evanescent coupling layer.

2. The arrangement as defined in claim 1 wherein the wavelength range is defined as a subset of wavelengths within the 1.1–1.65 $\mu$m range.

3. The arrangement as defined in claim 1 wherein the generated signals exhibit a beam size associated with providing a predetermined optical loss for the selected evanescent coupling layer thickness.

4. The arrangement as defined in claim 1 wherein the thickness of the evanescent coupling layer is selected to minimize optical loss at essentially the center wavelength for a predetermined beam size.

5. The arrangement as defined in claim 1 wherein the thickness of the evanescent coupling layer is selected to minimize optical loss over the wavelength range, the selected thickness being less than the thickness associated with minimal optical loss at the center wavelength.

6. The arrangement as defined in claim 1 wherein the evanescent coupling layer comprises a dielectric material.

7. The arrangement as defined in claim 6 wherein the refractive index of the dielectric material is selected to provide a predetermined acceptable optical loss over the wavelength range for the selected thickness of the relatively thin, planar silicon optical waveguide.

8. The arrangement as defined in claim 7 wherein the refractive index is greater than 1.3.

9. The arrangement as defined in claim 6 wherein the dielectric material is selected from the group consisting of: silicon dioxide, silicon nitride, silicon oxynitride and silicon carbide.

10. The arrangement as defined in claim 1 wherein the evanescent coupling layer comprises a single layer of material.

11. The arrangement as defined in claim 1 wherein the evanescent coupling layer comprises a plurality of sub-layers of material.

12. The arrangement as defined in claim 11 wherein each sub-layer of the plurality of sub-layers comprises the same material.

13. The arrangement as defined in claim 11 wherein at least two of the sub-layers of the plurality of sub-layers comprise a different material.

14. The arrangement as defined in claim 6 wherein the thickness of the planar silicon optical waveguide is selected to provide a predetermined acceptable loss over the wavelength range for the selected dielectric material of the evanescent coupling layer.

15. The arrangement as defined in claim 1 wherein the arrangement further comprises input optical interfacing elements disposed between the external light source and the prism coupling structure input facet for collimating, shaping and steering an input optical beam to a predetermined entry point and angle of incidence with respect to the input coupling facet.

16. The arrangement as defined in claim 1 wherein the arrangement further comprises:

output optical interfacing elements for collimating, shaping and steering an output beam toward a receiving element.

17. The arrangement as defined in claim 16 wherein the output optical interfacing elements further provide focusing of the output beam into the receiving element.

18. The arrangement as defined in claim 16 wherein the output optical interfacing and receiving elements are integrated, at least in part, with the relatively thin, planar optical waveguide.

19. The arrangement as defined in claim 16 wherein the output optical interfacing elements comprise discrete components disposed external to the output facet for collimating, shaping and steering an output beam towards an external receiving element.

20. The arrangement as defined in claim 15 wherein the input interfacing elements further comprise a beam steering system for directing an input optical beam to a predetermined entry point and angle of incidence on the prism coupling structure input coupling facet, the beam steering system capable of being translated and rotated to accomplish the directing function.

21. The arrangement as defined in claim 20 wherein the beam steering system functions to modify the entry point and angle of incidence by re-directing the input optical beam as the center wavelength changes.

22. The arrangement as defined in claim 20 wherein the beam steering system comprises at least one reflective optical element.

23. The arrangement as defined in claim 20 wherein the beam steering system comprises at least one transmissive optical element.

24. The arrangement as defined in claim 20 wherein the predetermined entry point and angle of incidence are selected to maximize optical coupling for a predetermined center wavelength.

25. The arrangement as defined in claim 20 wherein the arrangement further comprises an output beam steering system for directing an output optical beam from the prism coupling structure output coupling facet into a receiving optical device.

26. The arrangement as defined in claim 20 wherein the beam steering system comprises a plurality of beam steering elements, each beam steering element associated with a specified wavelength within the wavelength range, wherein each beam steering element is independently operated to direct its associated input beam to a predetermined entry point and angle of incidence on the prism coupling structure input coupling facet.

27. The arrangement as defined in claim 20 wherein the arrangement further comprises a feedback system for measuring the optical input signal coupled into the relatively thin, silicon optical waveguide and providing an adjustment output signal as an input to the beam steering system to modify the translational and rotational movements to maintain maximum optical coupling.

28. The arrangement as defined in claim 27 wherein the feedback system compares a tapped-off portion of the input optical signal from the relatively thin, silicon optical waveguide to a known maximum coupled signal, using the difference between the two values as the adjustment output signal.

29. The arrangement as defined in claim 27 wherein the feedback system compares the coupling efficiency of the input optical signal at the relatively thin, silicon optical waveguide to a known maximum value of coupling efficiency and uses the difference between the two values as the adjustment output signal.

30. An arrangement for providing optical coupling between an external light source generating optical signals at a plurality of different wavelengths, the plurality defined by a wavelength range and a center wavelength, and a relatively thin, planar silicon optical waveguide, the arrangement comprising:

an evanescent coupling region disposed over at least a portion of the planar silicon optical waveguide, the evanescent coupling region including
  an input evanescent coupling region, wherein the thickness of the input evanescent coupling region varies monotonically such that an initial coupled portion of an input optical beam intercepts a thickness that is less than the thickness intercepted by a central coupled portion of the optical beam, and a final coupled portion of the optical beam intercepts a thickness that is greater than the thickness intercepted by the central coupled portion of the optical beam; and
  an output evanescent coupling region, wherein the thickness of the output evanescent coupling region varies monotonically such that an initial coupled portion of an optical beam propagating along the planar silicon optical waveguide intercepts a thickness that is greater than the thickness intercepted by a central coupled portion of the propagating optical beam, and a final coupled portion of the propagating optical beam intercepts a thickness that is less than the thickness intercepted by the central coupled portion of the propagating optical beam; and
a silicon-based prism coupling structure disposed over the evanescent coupling region, the prism coupling structure including an input facet formed at a predetermined angle with respect to the planar silicon waveguide surface and an output facet formed at the predetermined angle with respect to the silicon planar waveguide surface, the prism coupling structure disposed over the evanescent coupling region.

31. The arrangement as defined in claim 30 wherein the wavelength range is defined as a subset of wavelengths in the 1.1–1.65 μm range.

32. The arrangement as defined in claim 30 wherein the thickness in the input and output portions of the evanescent coupling region vary linearly with distance along the propagation directly of the optical beam.

33. The arrangement as defined in claim 32 wherein the thickness of the input and output evanescent coupling portions at the locations intercepted by the central portion of the coupled optical beams and the slope of the linear variation are selected to achieved a predetermined value of optical loss over the wavelength range.

34. The arrangement as defined in claim 30 wherein the evanescent coupling region comprises a dielectric material.

35. The arrangement as defined in claim 30 wherein the refractive index of the dielectric material is selected to provide a predetermined acceptable optical loss over the wavelength range for a selected thickness of the relatively thin, planar silicon optical waveguide.

36. The arrangement as defined in claim 35 wherein the refractive index is greater than 1.3.

37. The arrangement as defined in claim 34 wherein the dielectric material is selected from the group consisting of: silicon dioxide, silicon nitride, silicon oxynitride and silicon carbide.

38. The arrangement as defined in claim 30 wherein the evanescent coupling region comprises a single layer of material.

39. The arrangement as defined in claim 30 wherein the evanescent coupling region comprises a plurality of layers of material.

40. The arrangement as defined in claim 39 wherein each layer of the plurality of layers comprises the same material.

41. The arrangement as defined in claim 39 wherein at least two of the layers of the plurality of layers comprise a different material.

42. The arrangement as defined in claim 34 wherein the thickness of the planar silicon optical waveguide is selected to provide a predetermined acceptable loss over the wavelength range for the selected dielectric material of the evanescent coupling layer.

43. The arrangement as defined in claim 30 wherein the arrangement further comprises
  input optical interfacing elements disposed between the external light source and the prism coupling structure input facet for collimating, shaping and steering an input optical beam to a predetermined entry point and angle of incidence with respect to the input facet.

44. The arrangement as defined in claim 30 wherein the arrangement further comprises
  output optical interfacing elements for collimating, shaping and steering an output beam toward a receiving element.

45. The arrangement as defined in claim 44 wherein the output optical interfacing elements further provide focusing of the output beam into the receiving element.

46. The arrangement as defined in claim 44 wherein the output optical interfacing and receiving elements are integrated, at least in part, with the relatively thin, planar optical waveguide.

47. The arrangement as defined in claim 44 wherein the output optical interfacing elements comprise discrete components disposed external to the output facet for collimating, shaping and steering an output beam towards an external receiving element.

48. The arrangement as defined in claim 43 wherein the input optical interfacing elements further comprise
  a beam steering system for directing an input optical beam to a predetermined entry point and angle of incidence on the prism coupling structure input facet, the beam steering system capable of being translated and rotated to accomplish the directing function.

49. The arrangement as defined in claim 48 wherein the beam steering system functions to modify the entry point and angle of incidence by re-directing the input optical beam as the center wavelength changes.

50. The arrangement as defined in claim 48 wherein the beam steering system comprises at least one reflective optical element.

51. The arrangement as defined in claim 48 wherein the beam steering system comprises at least one transmissive optical element.

52. The arrangement as defined in claim 48 wherein the predetermined entry point and angle of incidence are selected to maximize optical coupling for a predetermined center wavelength.

53. The arrangement as defined in claim 48 wherein the beam steering system functions to modify the position where the optical beam intercepts the input evanescent coupling portion until a predetermined value of coupling is achieved.

54. The arrangement as defined in claim 48 wherein the arrangement further comprises an output beam steering system for directing an output optical beam from the prism coupling structure output coupling facet into a receiving optical device.

55. The arrangement as defined in claim 48 wherein the beam steering system comprises a plurality of beam steering elements, each beam steering element associated with a specific wavelength within the wavelength range, wherein each beam steering element is independently operated to direct its associated input beam to a predetermined entry point and angle of incidence on the prism coupling structure input coupling facet.

56. The arrangement as defined in claim 48 wherein the arrangement further comprises a feedback system that monitors the input signal coupled into the relatively thin, planar silicon waveguide and provides adjustment signals to the beam steering system to modify the translational and rotational movements to maintain maximum input coupling.

57. The arrangement as defined in claim 56 wherein the feedback system compares a tapped-off portion of the input optical signal from the relatively thin, silicon optical waveguide to a known maximum coupled signal, using the difference between the two values as the adjustment output signal.

58. The arrangement as defined in claim 56 wherein the feedback system compares the coupling efficiency of the input optical signal at the relatively thin, silicon optical waveguide to a known maximum value of coupling efficiency and uses the difference between the two values as the adjustment output signal.

59. The arrangement as defined in claim 30 wherein the external light source comprises an optical fiber.

60. The arrangement as defined in claim 57 wherein the optical fiber comprises a lensed optical fiber.

61. The arrangement as defined in claim 44 wherein the receiving optical element comprises an optical fiber.

62. The arrangement as defined in claim 61 wherein the receiving optical fiber comprises a lensed optical fiber.

* * * * *